United States Patent
Choi et al.

(10) Patent No.: US 11,249,372 B2
(45) Date of Patent: Feb. 15, 2022

(54) CAMERA MODULE AND VEHICLE

(71) Applicant: LG INNOTEK CO., LTD., Seoul (KR)

(72) Inventors: Hyun Ho Choi, Seoul (KR); Kang Yeol Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 180 days.

(21) Appl. No.: 16/482,318

(22) PCT Filed: Feb. 12, 2018

(86) PCT No.: PCT/KR2018/001811
§ 371 (c)(1),
(2) Date: Jul. 31, 2019

(87) PCT Pub. No.: WO2018/147696
PCT Pub. Date: Aug. 16, 2018

(65) Prior Publication Data
US 2019/0353987 A1 Nov. 21, 2019

(30) Foreign Application Priority Data

Feb. 13, 2017 (KR) .................... 10-2017-0019639
Feb. 13, 2017 (KR) .................... 10-2017-0019640

(51) Int. Cl.
*G03B 17/55* (2021.01)
*G03B 17/12* (2021.01)
*H04N 5/225* (2006.01)

(52) U.S. Cl.
CPC ............. *G03B 17/12* (2013.01); *G03B 17/55* (2013.01); *H04N 5/225* (2013.01)

(58) Field of Classification Search
CPC ........ G03B 17/12; G03B 17/14; G03B 17/55; H04N 5/225; H04N 5/2251; H04N 5/2254;
(Continued)

(56) References Cited

U.S. PATENT DOCUMENTS

2006/0171704 A1* 8/2006 Bingle ................ H04N 5/2254
396/419
2009/0316040 A1 12/2009 Takatsuka et al.
(Continued)

FOREIGN PATENT DOCUMENTS

CN 101359088 2/2009
CN 105159009 12/2015
(Continued)

OTHER PUBLICATIONS

Chinese Office Action dated Sep. 17, 2020 issued in Application No. 201880011623.5.
(Continued)

*Primary Examiner* — Clayton E. LaBalle
*Assistant Examiner* — Fang-Chi Chang
(74) *Attorney, Agent, or Firm* — KED & Associates LLP

(57) ABSTRACT

A camera module comprises: a housing having a lens holder disposed outside thereof and a substrate unit disposed therein; a lens module disposed in the lens holder and including a first lens exposed to the outside; a heating element disposed on the lower surface of the lens; an image sensor mounted on the substrate unit so as to correspond to the lens module; and a connection unit for applying power to the lens module, wherein the connection unit comprises: a first connecting member electrically connected to the heating element so as to supply power; and a second connecting member extending from the first connecting member to an inside of the housing and electrically connecting the first connecting member and the substrate unit.

21 Claims, 9 Drawing Sheets

(58) Field of Classification Search
CPC ............. H04N 5/2252; H04N 5/22521; G02B 27/0006; G02B 1/18; G02B 1/10
See application file for complete search history.

(56) References Cited

U.S. PATENT DOCUMENTS

| | | |
|---|---|---|
| 2012/0170119 A1 | 7/2012 | Chu et al. |
| 2015/0205186 A1* | 7/2015 | Park ................. G03B 17/08 348/373 |
| 2016/0200264 A1 | 7/2016 | Bingle et al. |
| 2016/0349066 A1 | 12/2016 | Chung et al. |
| 2018/0176431 A1* | 6/2018 | Kim .................... H05K 1/0201 |

FOREIGN PATENT DOCUMENTS

| | | |
|---|---|---|
| CN | 105739217 | 7/2016 |
| EP | 1 626 583 | 2/2006 |
| EP | 3 340 601 | 6/2018 |
| KR | 10-2009-0132536 | 12/2009 |
| KR | 10-1132209 | 3/2012 |
| KR | 10-2015-0041409 | 4/2015 |
| KR | 10-2015-0071144 | 6/2015 |
| KR | 10-2016-0139748 | 12/2016 |
| WO | WO 2016/195403 | 12/2016 |

OTHER PUBLICATIONS

European Search Report dated Nov. 2, 2020 issued in Application No. 18751531.7.
International Search Report dated Jul. 2, 2018 issued in Application No. PCT/KR2018/001811.

* cited by examiner

CAMERA MODULE AND VEHICLE

CROSS-REFERENCE TO RELATED PATENT APPLICATIONS

This application is a U.S. National Stage Application under 35 U.S.C. § 371 of PCT Application No. PCT/KR2018/001811, filed Feb. 12, 2018, which claims priority to Korean Patent Application Nos. 10-2017-0019639 and 10-2017-0019640, filed Feb. 13, 2017, whose entire disclosures are hereby incorporated by reference.

TECHNICAL FIELD

The teachings in accordance with exemplary and non-limiting embodiments of this invention relate generally to a camera module and a vehicle.

BACKGROUND ART

This section provides background information related to the present invention, which is not necessarily prior art.

A camera module shooting a subject for a photo or an image may be coupled with various devices and equipment. In particular, concomitant with the influence by automation and sophistication of vehicular parts, vehicles mounted with camera modules have been marketed. The camera module may be used by being embedded on a front detection camera and a rear detection camera of a vehicle.

The vehicular camera module may be exposed to an outside to thereby become inferior in the shooting quality due to moisture. In order to solve the said disadvantage, one of the most common methods is to apply an indirect heating method using a hot wire, but there is a limit in terms of effective power consumption.

As a result, there is a need for researches on methods to directly heat an outermost lens of a vehicular camera module. However, the direct heating method still suffers from disadvantages in that a power transfer structure becomes complicated, and assembly becomes difficult to reduce the productivity. Another disadvantage is that lenses cannot be uniformly heated due to the thermal concentration phenomenon at a center of a lens.

DETAILED DESCRIPTION OF THE INVENTION

Technical Subject

Therefore, the exemplary embodiments of the present invention are to provide a camera module of direct heating method configured to be simple in power transfer structure and assembly and capable of uniformly heating a lens.

Technical Solution

In one generate aspect of the present invention, there is provided a camera module, comprising: a housing having a lens holder disposed outside thereof and a substrate unit disposed therein; a lens module disposed in the lens holder and including a first lens exposed to the outside; a heating element disposed on the lower surface of the lens; an image sensor mounted on the substrate unit so as to correspond to the lens module; and a connection unit for applying power to the lens module, wherein the connection unit comprises: a first connecting member electrically connected to the heating element so as to supply power; and a second connecting member extending from the first connecting member to an inside of the housing and electrically connecting the first connecting member and the substrate unit.

Preferably, but not necessarily, the lens module may further include a first lens barrel disposed on the lens holder to accommodate the lens, and the first lens barrel may include a connection member reception unit disposed on a lateral surface and formed with a first reception hole through which the second connecting member passes.

Preferably, but not necessarily, the lens module may further include a first lens barrel disposed at an inside of the lens holder to accommodate a second lens, and a second lens barrel disposed at an outside of the lens holder to accommodate the first lens barrel and the first lens, wherein the first lens barrel may include a connection member reception unit disposed at a lateral surface and formed with a first reception hole through which the second connecting member passes.

Preferably, but not necessarily, the first connecting member may be an insulation material-coated ring-shaped PCB (Printed Circuit Board), and may include an electrode unit exposed from the insulation material to be electrically connected to the heating element.

Preferably, but not necessarily, the electrode unit may include a first electrode and a second electrode, wherein the first electrode may be electrically connected to the heating element by a first conductive member, and the second electrode may be electrically connected to the heating element by a second conductive member.

Preferably, but not necessarily, the first and second conductive members may be a conductive adhesive, an isotropic conductive film or an anisotropic conductive film.

Preferably, but not necessarily, the first lens may further include a first reflection prevention unit disposed at an upper surface of lens body, and a second reflection prevention unit disposed at a lower surface of the heating element, wherein an area corresponding to the electrode unit at a lower surface of the heating element may be electrically connected to the electrode unit by being exposed from the second reflection prevention unit.

Preferably, but not necessarily, the second connecting member may include a first terminal disposed at one side in a plated shape extended from the first connecting member to the substrate unit and electrically connected to the first connecting member and a second terminal disposed at the other side to be electrically connected to the substrate unit.

Preferably, but not necessarily, the first terminal may be electrically connected to the first connecting member by a third conductive member wherein the third conductive member may be a conductive adhesive, an isotropic conductive film or an anisotropic conductive film.

In another general aspect of the present invention, there is provided a vehicle, comprising: a body; one or more doors mounted on the body; a display unit disposed at an inside of the body; and a camera module disposed on any one or more of the body, or one or more of the doors to be electrically connected to the display unit, wherein the camera module comprises: a housing having a lens holder disposed outside thereof and a substrate unit disposed therein; a lens module disposed in the lens holder and including a first lens exposed to the outside; a heating element disposed on the lower surface of the lens; an image sensor mounted on the substrate unit so as to correspond to the lens module; and a connection unit for applying power to the lens module, wherein the connection unit comprises: a first connecting member electrically connected to the heating element so as to supply power; and a second connecting member extending from the first connecting member to an inside of the housing and electrically connecting the first connecting member and the substrate unit.

Advantageous Effects

According to the present invention, a connecting unit electrically connecting a first lens disposed at an outside of a housing to a substrate unit disposed at an inside of the housing is divided to a first connecting member and a second connecting member. As a result, assembly can be implemented faster and easily than a case where the first connecting member and the second connecting member are integrally formed.

Furthermore, a lens may be substantially uniformly heated by allowing a resistance of a heating material disposed at an inside to be different from that of a heating material disposed at an outside.

BEST MODE

Figure 1:
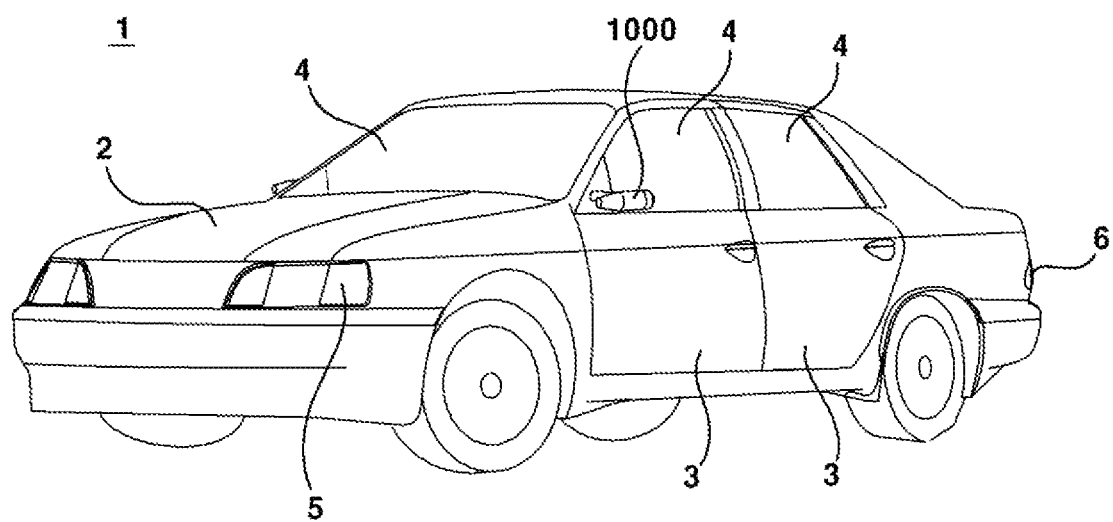
FIG. 1 is a perspective view illustrating a vehicle according to an exemplary embodiment of the present invention.

The present invention may be embodied in many different variations and in several exemplary embodiments, and specific exemplary embodiments will be exemplified through drawings and described in detail in the following Detailed Description.

However, it is to be understood that the invention is not limited in its application to any particular exemplary embodiments, and various modifications, additions and substitutions are possible, without departing from the scope and spirit of the invention as disclosed in the accompanying claims. In describing the present invention, if it is determined that the detailed description on the related known technology makes the gist of the present invention unnecessarily ambiguous, the detailed description will be omitted.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

It will be further understood that the terms "comprises", "includes" and/or "comprising," and "including" when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Furthermore, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section.

Hereinafter, an "x axis direction" described in the drawings may be defined as "left/right (horizontal) direction". An "x axis arrow direction" may be defined as "right side".

Hereinafter, a "y axis direction" described in the drawings may be defined as "front/rear direction". A "y axis arrow direction" may be defined as "front side".

Hereinafter, a vehicle according to an exemplary embodiment will be described with reference to the accompanying drawings. FIG. 1 is a perspective view of a vehicle according to an exemplary embodiment of the present invention.

The vehicle (1) according to an exemplary embodiment of the present invention may include a body (2), a door (3), a glass (4), a head lamp (5), a tail lamp (6) and a camera module (1000).

The body (2) may be an external member of a vehicle (1). The body (2) may take various shapes such as frame type, a monocoque type and the like. A lateral surface of body (2) may be coupled by one or more doors (3). Furthermore, a front side and a rear side (where filler is formed) of an upper surface of body (2), and the door (3) may be coupled by glass (4). A front lower side of body (2) may be mounted with a head lamp (5). A rear lower side of body (2) may be mounted with a tail lamp (6). A camera module (1000) according to an exemplary embodiment may be mounted on the vehicle (1). Therefore, the camera module (1000) may be called a "vehicular camera".

At least one or more of a lateral surface of body (2) and one or more of the doors (3) may be installed with a camera module (1000). That is, the camera module (1000) according to an exemplary embodiment of the present invention may be installed on a front side, a rear side and a lateral side of body (2), and one or more of the doors (3). For example, the camera module (1000) may be installed on a front part (grille, emblem and the like) of body (2), a lateral surface (side outer or garnish and the like) of body (2), and a rear surface (trunk, emblem, garnish and the like) of body (2). Furthermore, the camera module (1000) may be installed on a front side of glass (4) coupled to the door (3). Thus, the camera module (1000) may be replaced by a side rear view mirror in the vehicle (1) according to an exemplary embodiment of the present invention.

The image shot by the camera module (1000) may be electrically connected to a display unit (not shown) through an ECU (Electric Control Unit). The image shot by the camera module (100) may be controlled by the ECU, and may be reproduced by the display unit.

The image is described to be reproduced through the ECU inside the vehicle (1) according to the exemplary embodiment of the present invention. However, the present invention is not limited thereto, and an image may be directly transmitted to a display unit by a system disposed inside the camera module (1000) functioning as an ECU. In this case, the ECU may be mounted on a substrate unit (400) of the camera module (1000).

An indoor space may be formed at an inside of body (2). The inside of the body (2) may be disposed with a display unit. The display unit may output an image photographed by the camera module (1000). The display unit may be disposed on a dashboard (not shown) inside the body (2).

Hereinafter, a camera module commonly applied to a first exemplary embodiment and to a second exemplary embodiment will be described with reference to the accompanying drawings.

Figure 2:
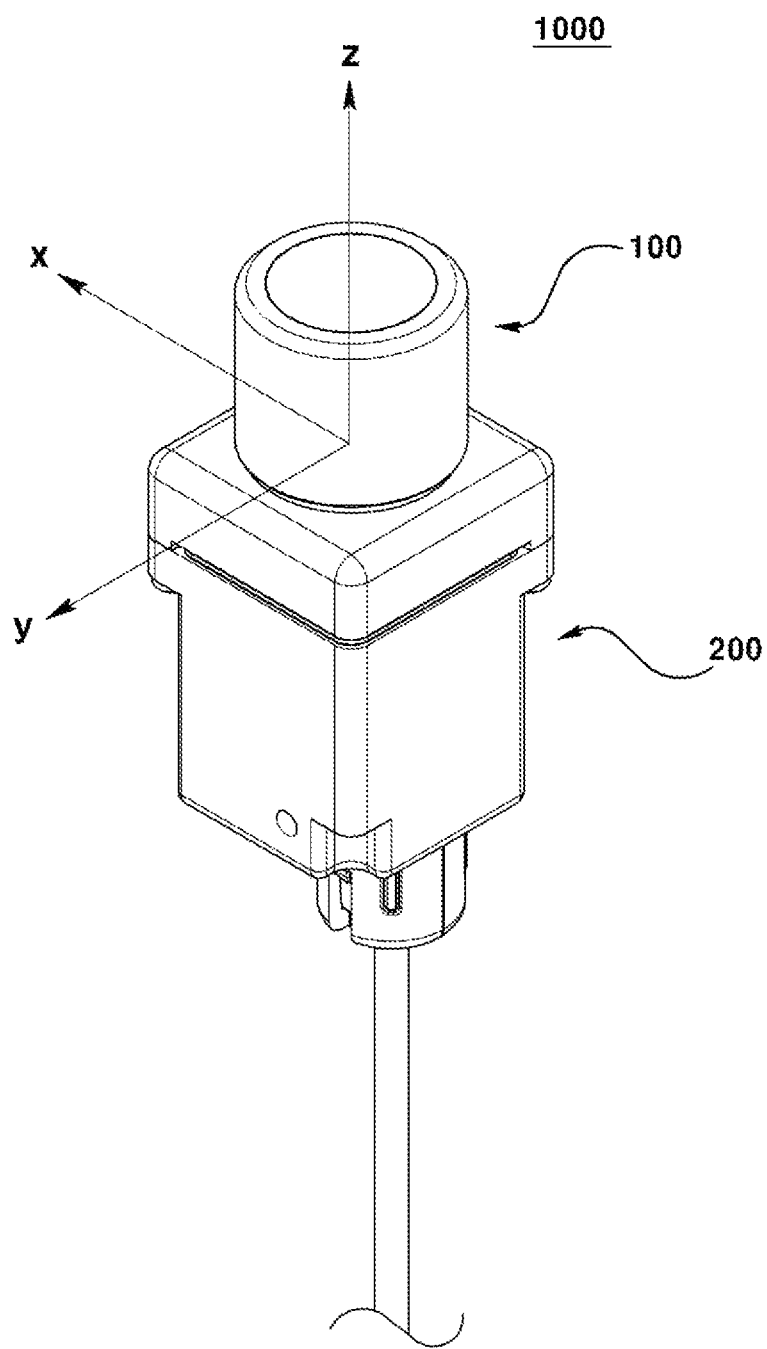
FIG. 2 is a perspective view illustrating a camera module according to an exemplary embodiment of the present invention.
Figure 3:
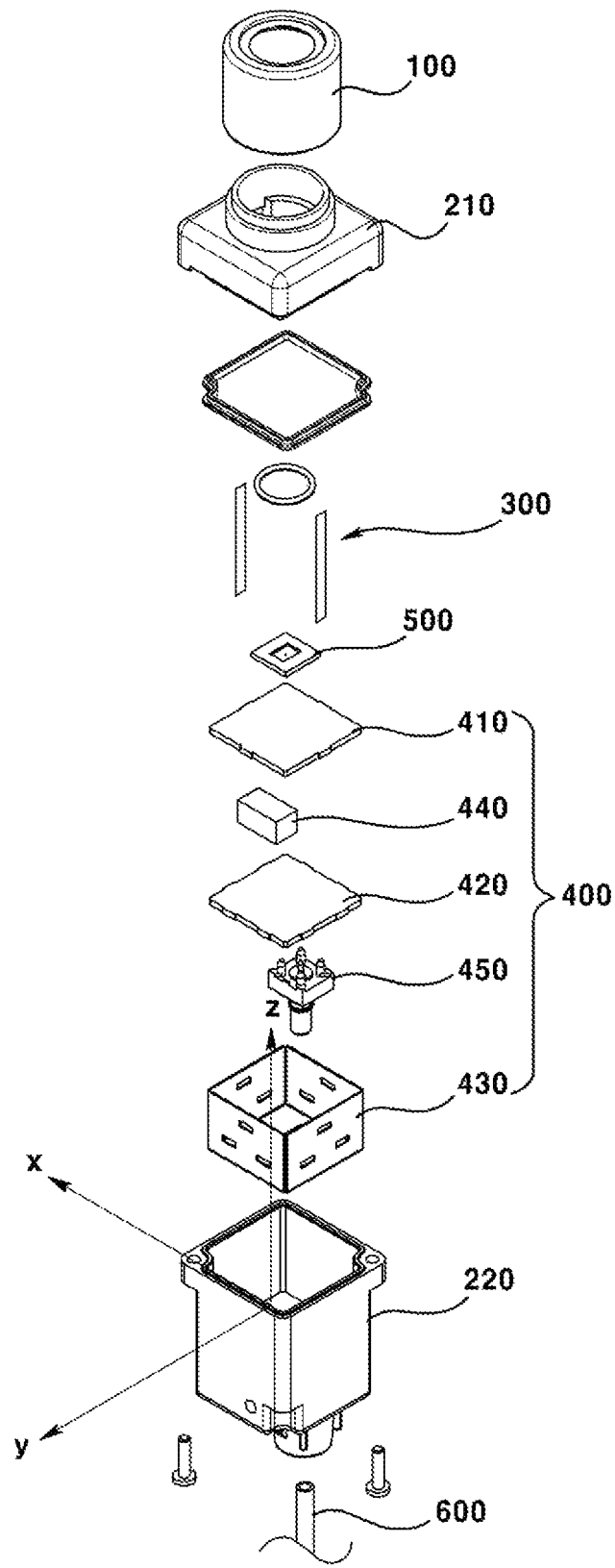
FIG. 3 is an exploded perspective view illustrating a camera module according to an exemplary embodiment of the present invention.
Figure 4:
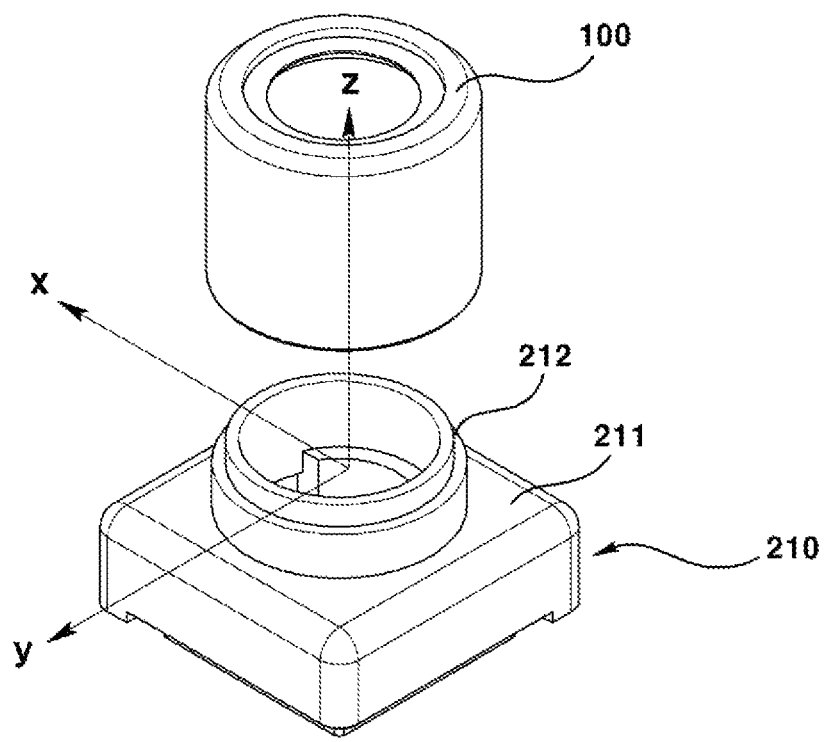
FIG. 4 is an exploded perspective view illustrating a lens module and a cover housing according to an exemplary embodiment of the present invention.
Figure 5:
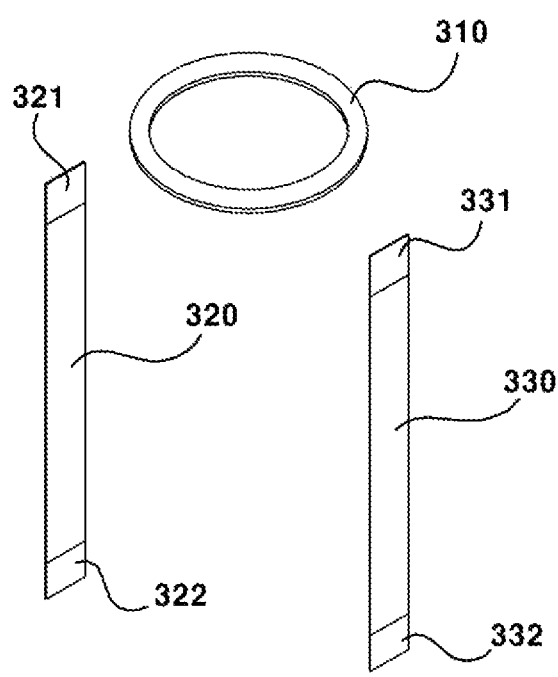
FIG. 5 is a perspective view illustrating a connecting unit according to an exemplary embodiment of the present invention.
Figure 6:
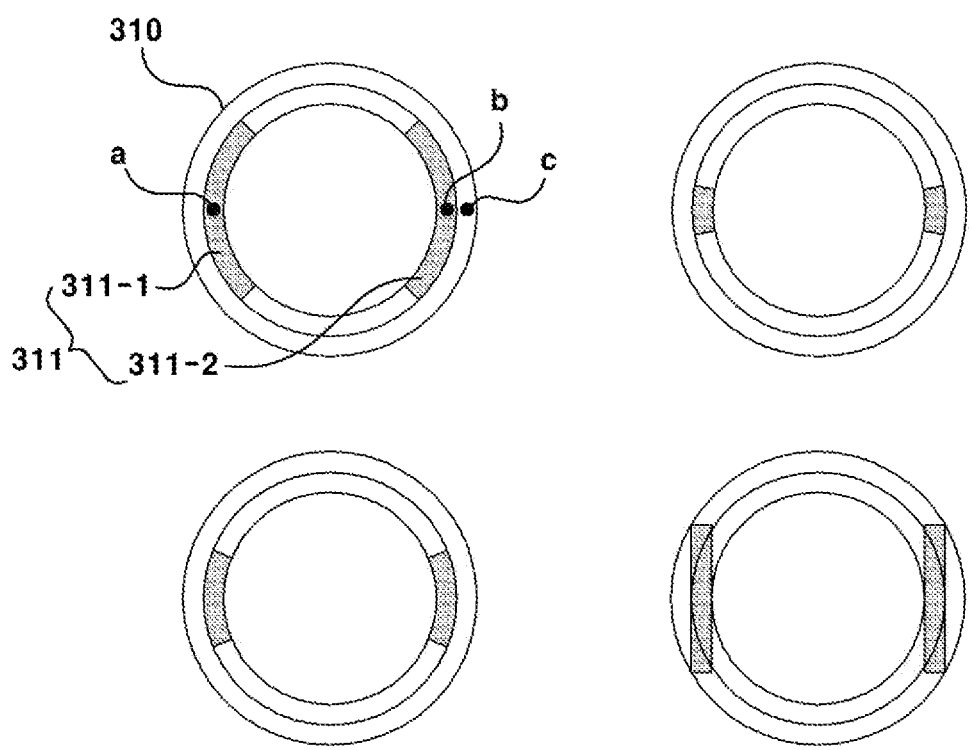
FIG. 6 is a plan view illustrating a first connecting member according to an exemplary embodiment of the present invention.
Figure 7:
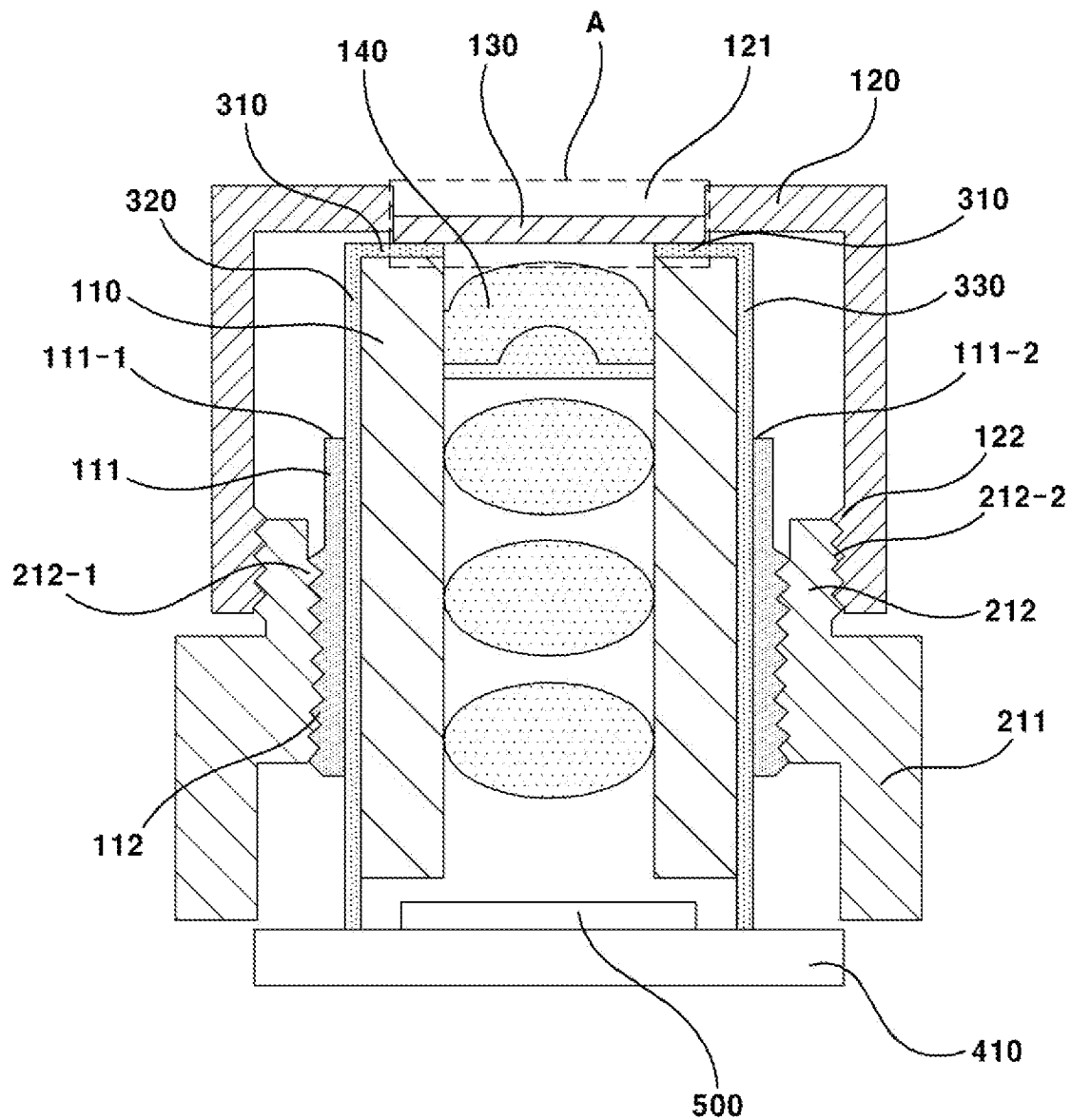
FIG. 7 is a cross-sectional view illustrating a power transfer structure according to an exemplary embodiment of the present invention.
Figure 8:
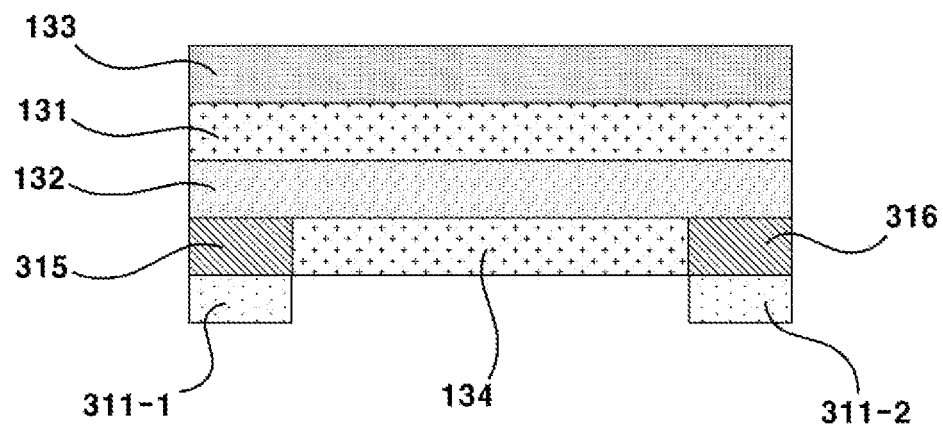
FIG. 8 is a cross-sectional view in which CA' area of FIG. 7 is enlarged.

FIG. 2 is a perspective view illustrating a camera module according to an exemplary embodiment of the present invention, FIG. 3 is an exploded perspective view illustrating a camera module according to an exemplary embodiment of the present invention, FIG. 4 is an exploded perspective view illustrating a lens module and a cover housing according to an exemplary embodiment of the present invention, FIG. 5 is a perspective view illustrating a connecting unit according to an exemplary embodiment of the present invention, FIG. 6 is a plan view illustrating a first connecting member according to an exemplary embodiment of the present invention, FIG. 7 is a cross-sectional view illustrating a power transfer structure according to an exemplary embodiment of the present invention, and FIG. 8 is a cross-sectional view in which CA area of FIG. 7 is enlarged.

A camera module (1000) according to an exemplary embodiment of the present invention may include a lens module (100), a housing (200), a connection unit (300), a substrate unit (400), an image sensor (500) and a cable (600).

The lens module (100) may be disposed at an upper surface of the housing (200). The lens module (100) may be disposed on a lens holder (212). A light having passed the lens module (100) may be irradiated on the image sensor (500) inside the housing (200).

The lens module (100) may include a first lens barrel (110), a second lens barrel (120), a first lens (130) and a second lens (140). However, the second lens barrel (120) may be omitted by design request.

The first lens barrel (110) may be a plastic injection. The first lens barrel (110) may take an upper/bottom opened hollow cylindrical shape. The first lens barrel (110) may be disposed at an inside of a lens holder (212). Furthermore, the first lens barrel (110) may be disposed at an inside of the second lens barrel (120). That is, the first lens barrel (110) may be accommodated into the second lens barrel (120) and the lens holder (212).

The first lens barrel (110) may be accommodated by a plurality of lens including a second lend (140) disposed at an inside of the first lens (130). The first lens barrel (110) may not be accommodated by the first lens (130). The plurality of lenses accommodated into the first lens barrel (110) may take a shape of being stacked one over the other, each spaced apart from the other. The plurality of lenses may be aligned to form an optical axis. However, when the second lens barrel (120) is omitted, the first lens barrel (110) may be accommodated by a plurality of lenses including the first lens (130) and the second lens (140).

The first lens barrel (110) may be supported by the first lens (130). In this case, a first connection member (310) may be interposed between an upper surface of the first lens barrel (110) and a lower surface of the first lens (130). Furthermore, an upper surface of the first connection member (310) may be brought into contact with a lower surface of the first lens (130) and a lower surface of the first connection member (310) may be brought into contact with an upper surface of the first lens barrel (110).

A lateral surface of first lens barrel (110) may be disposed with a second connection member (320) and a third connection member (330), each spaced apart and vertically extended. The first lens barrel (110) may be brought into contact with the second connection member (320) and the third connection member (330). The second connection member (320) and the third connection member (330) may be insert-molded when the first lens barrel (110) is injected.

The first lens barrel (110) may include a connection member reception unit (111). The connection member reception unit (111) may be integrally formed with the first lens barrel (110). The connection member reception unit (111) may be disposed at a lateral center area of the first lens barrel (110). The connection member reception unit (111) may take a shape radially protruded to an outside from a lateral surface of the first lens barrel (110).

The connection member reception unit (111) may be disposed with a first reception hole (111-1) and a second reception hole (111-2), each spaced apart and vertically extended. The first reception hole (111-1) may be passed through by the second connection member (320). The second reception hole (111-2) may be passed through by the third connection member (330). That is, the second connection member (320) and the third connection member (330) may enter into a housing (200) through the first reception hole (111-1) and the second reception hole (111-2).

An external lateral surface of the connection member reception unit (111) may be formed with a first screw unit (112). The first screw unit (112) may be screw-connected to a second screw unit (21201) formed at an inner lateral surface of lens holder (212). As a result, the first lens barrel (110) may be coupled with the lens holder (212). In this case, the first lens barrel (110) may be internally inserted into the lens holder (212). A lower surface of the first lens barrel (110) may be accommodated into the housing (200).

The second lens barrel (120) may be a plastic injection. The second lens barrel (120) may take a hollow cylindrical shape. The second lens barrel (120) may include an upper surface formed with an optical hole (121) and a lateral surface downwardly extended from an edge of the upper surface.

The second lens barrel (120) may be disposed at an outside of the lens holder (212). Furthermore, the second lens barrel (120) may be disposed at an inside of the first lens barrel (110). That is, the second lens barrel (120) may accommodate the first lens barrel (110) and the lens holder (212).

A second connection member (320) and the third connecting member (330) may be interposed between a lateral surface of second lens barrel (120) and a lateral surface of first lens barrel (110).

The optical hole (121) of the second lens barrel (120) may be disposed with a first lens (130). In this case, the first lens (130) may be aligned with an optical axis of the plurality of lenses accommodated into the first lens barrel (110). Furthermore, the first lens (130) may be disposed at an outside (uppermost layer, external most side) of the plurality of lenses accommodated into the first lens barrel (110). This is because a lateral surface of second lens barrel (120) is upwardly extended over a lateral surface of the first lens barrel (110).

An inner lateral surface of second lens barrel (120) may be formed with a third screw unit (122). The third screw unit (122) may be screw-connected with a fourth screw unit (212-2) formed at an outside of lens holder (212). As a result, the second lens barrel (120) may be coupled with the lens holder (212). In this case, the second lens barrel (120) may be internally-inserted by the lens holder (212).

The first lens (130) may be a lens disposed at an outermost area (outermost layer) from the lens module (100). The first lens (130) may be exposed to outside. Thus, the first lens (130) may be degraded in quality due to raindrops or dewdrops being formed thereon. The first lens (130) may be disposed on an optical hole (121) of second lens barrel (120). When the second lens barrel (120) is omitted, the first lens (130) may be disposed at an outermost area (uppermost layer) of lens barrel (110).

The first lens (130) may be supported by the first lens barrel (110). In this case, a first connection member (310) may be interposed between the first lens (130) and the first lens barrel (110).

Hereinafter, a stacked coated structure and heating structure of first lens (130) will be described with reference to FIG. 8. FIG. 8 is a cross-sectional view in which CA area of FIG. 7 is enlarged.

The first lens (130) may include a lens body (131), a heating element (132), a first reflection prevention unit (133) and a second reflection prevention unit (134).

The lens body (131) may be an optical lens to refract an outside light in response to a design condition. A lower surface of lens body (131) may be disposed with a heating element (132). A lower surface of lens body (131) may be coated by the heating element (132).

The heating element (132) may be a transparent resistance body and may generate a heat when a power is applied. For example, the heating element may be an ITO (Indium Tin Oxide). When a power is supplied to the heating element (132), moisture formed on the lens body (131) may be evaporated. That is, the heating element (132) may remove the moisture by heating the lens body (131).

An upper surface of lens body (131) may be disposed with a first reflection prevention unit (133). An upper surface of lens body (131) may be coated by the first reflection prevention unit (133).

A lower surface of heating element (132) may be disposed with a second reflection prevention unit (134). A lower surface of heating element (132) may be coated by the second reflection prevention unit (134).

The first reflection prevention unit (133) and the second reflection prevention unit (134) are provided to increase the transmittance rate (AR, Anti Reflection) of lens body (131) and may be omitted in response to an optical design request.

The second reflection prevention unit (134) may be so disposed as to allow an area contacted by an electrode unit (311) of first connection member (310) on the heating element (132) to be exposed. That is, an area corresponded by the electrode unit (311) with the heating element (132) may be exposed from the second reflection prevention unit (134) to be electrically connected to the electrode unit (311).

The electrode unit (311) may apply a power to the heating element (132). The electrode unit (311) may include a first electrode (311-1) having a positive pole and a second electrode (311-2) having a negative pole. The first electrode (311-1) may be electrically connected to the heating element (312) by a first conductive member (315). The second electrode (311-2) may be electrically connected to the heating element (312) by a second conductive member (316).

The first conductive member (315) and the second conductive member (316) may be a conducting (conductive) adhesive, an isotropic conducting film, an ACF (Anisotropic Conducting Film), and the like. Particularly, the ACF that vertically controls a current, as a heating element (132) on the electrode unit (311), may improve a heating efficiency by facilitating a current flow.

The housing (200) may be an external member of a camera module (1000). The housing (200) may be a plastic injection. The housing (200) may include a cover housing (210) and a body housing (220).

The cover housing (210) may be disposed on the body housing (220). The cover housing (210) and the body housing (220) may be coupled by fusion, screw-connection and the like. The cover housing (210) may open or close an upper opening of the body housing (220). The cover housing (210) may tightly seal an inner space of body housing (220). A gasket may be interposed between the cover housing (210) and the body housing (220) for improved tight sealing.

The cover housing (210) may include a cover (211) and a lens holder (212). The cover (211) and the lens holder (212) may be integrally formed.

The cover (211) may be disposed on the body housing (220). The cover (211) may be disposed in a shape to open or close an upper opening of the body housing (220). The cover (211) may include a plate-shaped upper surface and a lateral surface downwardly extended from each side of the upper surface. The upper surface of cover (211) may be disposed with a lens holder (212). The cover (211) may be centrally disposed with a lens holder (212).

The lens holder (212) may be formed at an upper surface of the cover (211). The lens holder (212) may take a hollow cylindrical shape. The lens holder (212) may be disposed at an inside thereof with a first lens barrel (110). The lens holder (212) may be disposed at an outside thereof with a second lens barrel (120). The lens holder (212) may be coupled with the first lens barrel (110) and the second lens barrel (120).

The body housing (220) may take an upper surface-opened hollowed block shape. The body housing (220) may be disposed at an upper surface with the cover housing (210). The upper opening of body housing (220) may be closed by the cover housing (210). As a result, the body housing (220) may be formed with a tightly sealed inner space.

The body housing (220) may be accommodated by a second connecting member (320), a third connecting member (330), a substrate unit (400), an image sensor (500) and a cable (600). The body housing (220) may be disposed at an inside thereof with a second connecting member (320) and a third connecting member (330) having passed the first lens barrel (110). The inside of the body housing (220) may be such that an upper distal end is mounted on the substrate unit (400) and a cable (600) externally extended by passing through the body housing (220) is disposed. To this end, a lower surface of body housing (220) may be formed with a cable reception unit through which the cable (600) passes.

The connection unit (300) may supply a power to the lens module (100). The connection unit (300) may include a first connecting member (310), a second connecting member (320) and a third connecting member (330). However, the third connecting member (330) may be omitted in response to a design request. The first connecting member (310), the second connecting member (320) and the third connecting member (330) may be integrally formed or may be separably formed to respectively be a separate individual member.

The first connecting member (310) may be a PCB (Printed Circuit Board). The first connecting member (310) may be an FPCB (Flexible Printed Circuit Board).

The first connecting member (310) may take a flat ring shape formed with an upper surface and a lower surface. The first connecting member (310) may be electrically connected to the heating element (132). The first connecting member (310) may supply a power to the heating element (132). The first connecting member (310) may be electrically connected to the second connecting member (320) and the third connecting member (330). The first connecting member (310) may receive a power through the second connecting member (320) and the third connecting member (330).

The first connecting member (310) may be interposed between the first lens (130) and the first lens barrel (110). The first connecting member (310) may be disposed underneath the heating element (132). The first connecting member (310) may be disposed at an area corresponding to an edge of the heating element (132).

The first connecting member (310) may be coated with an insulation material. The first connecting member (310) may include an electrode unit (311) exposed from the insulation material of the first connecting member. That is, the electrode unit (311) may have a conductive line exposed due to there being coated no insulation material (SR Open, Solder Resist Open).

As a result, when the electrode unit (311) and the heating element (132) are brought into contact, the heating element (132) may be applied with a power. In this case, the electrode unit (311) may be directly brought into contact with the heating element (132) to be electrically connected, or the first conductive member (315) and the second conductive member (316) may be interposed between the electrode unit (311) and the heating member (132) to allowing being electrically connected.

Moreover, when the second reflection prevention unit (134) is coated on a lower surface of the heating element (132), an area corresponding to the electrode unit (311) at a lower surface of heating element (132) may be exposed from the second reflection prevention unit to be electrically connected to the electrode unit (311).

The electrode unit (311) may be formed at an upper surface of first connecting member (310) and may be formed at a lower surface of the first connecting member (310). Hereinafter, a case of the electrode unit (311) being formed at an upper surface of the first connecting member (310) will be described by way of example.

The electrode unit (311) may include a first electrode (311-1) having a positive polarity and a second electrode (311-2) having a negative polarity. The first electrode (311-1) and the second electrode (311-2) may be disposed in various shapes and arrangements as illustrated in FIG. 6.

The first electrode (311-1) and the second electrode (311-2) may take a linear shape. This is because even if the heating element (132) has a same sheet resistance (Ω/sq), an electric field may be differently formed in response to the shape of electrode. That is, an effective resistance value may be varied in response to a current flow pattern.

The effective resistance may be inversely proportional to a length of an electrode, and proportional to a gap of an electrode. Thus, it is preferable that the first electrode (311-1) and the second electrode (311-2) take a linear shape instead of a spot shape for stability of effective resistance value and uniform current distribution. The first electrode (311-1) and the second electrode (311-2) may take an arc shape disposed at a radial inside of the first connecting member (310). The first electrode (311-1) and the second electrode (311-2) may take a rectangular shape for convenience of manufacturing.

The first electrode (311-1) and the second electrode (311-2) may be symmetrically disposed about a center of the first connecting member (310). As a result, a uniform current may flow to the heating element (132) between the first electrode (311-1) and the second electrode (311-2) to thereby increase a heating efficiency.

The second connecting member (320) and the third connecting member (330) may be a PCB (Printed Circuit Board). The second connecting member (320) and the third connecting member (330) may be an FPCB (Flexible Printed Circuit Board). The second connecting member (320) and the third connecting member (330) may be extended into the housing (200) to electrically connect the first connecting member (310) and the substrate unit (400).

The second connecting member (320) and the third connecting member (330) may be spaced apart from each other. The second connecting member (320) and the third connecting member (330) may take a plate shape extended from the first connecting member (310) to the substrate unit (400). The second connecting member (320) and the third connecting member (330) may pass through the housing (200), may be interposed between the housing (200) and the first lens barrel (110), or may be led into the housing (200) through a reception space separately arranged on the first lens barrel (110). In the present exemplary embodiment, a case of the second connecting member (320) and the third connecting member (330) being led into through a reception space separately provided on the first lens barrel (110) will be described by way of an example.

The second connecting member (320) may be led into the housing (200) through a first reception hole (111-1) formed on a connection member reception unit (111) of the first lens barrel (110). The third connecting member (330) may be led into the housing (200) through a second reception hole (111-2) formed on a connection member reception unit (111) of the first lens barrel (110). The second connecting member (320) may include a first terminal (321) disposed at an upper side and a second terminal (322) disposed at a lower side.

The first terminal (321) may be electrically connected to the first electrode (311-1). The first terminal (321) may be electrically connected with the first electrode (311-1) by being directly brought into contact with the first electrode (311-1) (see 'a' point of FIG. 6).

Moreover, the first terminal (321) may be electrically connected to the first electrode (311-1) by a third conductive member (not shown). That is, a third conductive member may be interposed between the first terminal (321) and the first electrode (311-1).

The third conductive member may be a conducting (conductive) adhesive, an isotropic conducting film, an ACF (Anisotropic Conducting Film) and the like. Particularly, the ACF that vertically controls a current may improve a heating efficiency by facilitating a current flow from the first terminal (321) to the first electrode (311-1).

The first terminal (321) may be curved or bent in order to be electrically connected to the first electrode (311-1).

The second terminal (322) may be electrically connected to the substrate unit (400). That is, the second terminal (322) may be mounted on the substrate unit (400) to apply a positive voltage to the second connecting member (320). Thus, the second connecting member (320) may allow a current to flow from a lower side to an upper side.

The third connecting member (330) may include a third terminal (331) disposed at an upper side and a fourth terminal (332) disposed at a lower side.

The third terminal (331) may be electrically connected to the second electrode (311-2). The third terminal (331) may be electrically connected to the second electrode (311-2) by being directly brought into contact with the second electrode (311-2) (see 'b' point of FIG. 6).

Moreover, the third terminal (331) may be electrically connected to the second electrode (311-2) by a fourth conductive member (not shown). That is, a fourth conductive member may be interposed between the third terminal (331) and the second electrode (311-2).

The fourth conductive member may be a conducting (conductive) adhesive, an isotropic conducting film, an ACF (Anisotropic Conducting Film) and the like. Particularly, the ACF that vertically controls a current may improve a heating efficiency by facilitating a current flow from the third terminal (331) to the second electrode (311-2).

The third terminal (331) may be curved or bent in order to be electrically connected to the second electrode (311-2).

The fourth terminal (332) may be electrically connected to the substrate unit (400). That is, the fourth terminal (332) may be mounted on the substrate unit (400) to apply a negative voltage to the third connecting member (330). Thus, the third connecting member (330) may allow a current to flow from an upper side to a lower side.

The third connecting member (330) may be omitted in response to a design request. That is, only the second connecting member (320) may exist. In this case, the second connecting member (320) may be formed by allowing a conductive line in which a current flows from a lower side to an upper side and a conductive line in which a current flows from an upper side to a lower side to be separated. Furthermore, the second connecting member (320) may be electrically connected to an area where the electrode unit (311) is not formed on the first connecting member (310) (see 'c' point of FIG. 6). This is to prevent the activation only on a partial area in the first electrode (311-1) and the second electrode (311-2). Toward this end, the 'c' point of the first connecting member (310) may be formed with a separate terminal (not shown).

The connection unit (300) may be integrally formed, and may be formed by being connected with individual members. Hereinafter, an effect of a case where the first connecting member (310), the second connecting member (320) and the third connecting member (330) of the connection unit (300) are of a separate member will be described. Each of the first connecting member (310), the second connecting member (320) and the third connecting member (330) may be a mutually separated member and may be in a state of being electrically connected.

When a camera module (1000) is assembled, the processes are done in the order of embedding the housing (200) to the substrate unit (400), mounting a plurality of lenses including the second lens (140) to the first lens barrel (110), mounting the first lens barrel (110) to the housing (200), mounting the second lens barrel (120) to the housing (200), and mounting the first lens (130) to the second lens barrel (120).

When the first connecting member (310), the second connecting member (320) and the third connecting member (330) are divided to a separate member, the first lens (130) and the second connecting member (310) may be coupled in advance before mounting the first lens (130). In this case, a uniform pressure can be applied to allow the electrode unit (311) to be stably brought into contact with the first lens (130).

Furthermore, the assembly process may become simpler because of being connected to the substrate unit (400) by entering the second connecting member (320) and the third connecting member (330) into an inside of the housing (200) through the first lens barrel (110) prior to mounting of the second lens barrel (120).

Thereafter, in the process of mounting the second lens barrel (120) to the housing (200) and mounting the first lens (130) to the second lens barrel (120), the first connecting member (310) may be electrically connected to the second connecting member (320) and the third connecting member (330) by allowing the second connecting member (320) and the third connecting member (330) to be brought into contact, whereby the manufacturing can be completed.

The substrate unit (400) may be disposed at an inside of the housing (200). The substrate unit (400) may be disposed at an inside of the body housing (200). The substrate unit (400) may be a concept commonly calling electronic parts electronically controlling the camera module (1000) and a substrate mounted with the electronic parts. The substrate unit (400) may include a first substrate (410), a second substrate (420), a shield can (430), a substrate connector (440) and a cable connector (450).

The first substrate (410) may be a PCB (Printed Circuit Board). The first substrate (410) may be upwardly spaced apart from the second substrate (420). The first substrate (410) may be mounted with an image sensor (500). The first substrate (410) may be mounted with a second connecting member (320) and a third connecting member (330). The first substrate (410) may be electrically connected to the second substrate (420) by a substrate connector (440).

The first substrate (410) may supply an outside power to the second connecting member (320) and the third connecting member (330) through the second substrate (420). As a result, the outside power may be transmitted to the first connecting member (310) through the second connecting member (320) and the third connecting member (330).

The first substrate (410) may transmit an electric signal generated by the image sensor (500) to an outside through the second substrate (420). The second substrate (420) may be a PCB (Printed Circuit Board). The second substrate (420) may be downwardly spaced apart from the first substrate (410). The second substrate (420) may be mounted with a cable (600). The second substrate (420) may be electrically connected to the first substrate (410) through a substrate connector (440).

The second substrate (420) may be electrically connected to outside electronic devices {e.g., an electronic control unit or a power unit of vehicle (1)} through the cable (600). The cable (600) may be docked to outside electronic devices by passing through a lower surface of body housing (220). Thus, the second substrate (420) may be electrically connected to the outside electronic devices. As a result, the second substrate (420) may receive a power or an electronic signal controlled by the outside electronic devices.

However, it should be appreciated that a controller (not shown) may be mounted on the first substrate (410) itself or on the second substrate (420) itself to control the power supplied from the outside electronic devices. Furthermore, the controller may be divisibly disposed or biasedly disposed on an outside electronic device, the first substrate (410) and the second substrate (420) and the like in response to request of electronic design.

The shield can (430) may take an upper/bottom opened hollowed block shape. The shield can (430) may accommodate the first substrate (410) and the second substrate (420). The shield can (430) may shield an outside electronic wave. The shield can (430) may prevent an electronic wave generated from the first substrate (410) and the second substrate (420) from being discharged to outside The shield can (430) may be fixed by the first substrate (410) and the second substrate (420) by being assembled with the first substrate (410) and the second substrate (420).

The image sensor (500) may be disposed inside of the housing (200). The image sensor (500) may be mounted on the first substrate (410). The image sensor (500) may be disposed to be aligned with an optical axis of the lens module (100). As a result, a light having passed the lens module (100) may be irradiated on the image sensor (500). The image sensor (500) may convert the obtained light to a digital signal. The image sensor (500) may be a CCD (Charge Coupled Device), a MOS (Metal Oxide Semi-Conductor), a CPD and a CID. However, the types of image sensor (500) are not limited thereto.

The cable (600) may be a conductive line coupled by several element wires. The cable (600) may be mounted on the second substrate (420). The cable (600) may electrically connect the second substrate (420) to outside electronic devices. The cable (600) may be electrically connected at an upper distal end to the second substrate (420). The cable (600) may be extended to a lower side from an upper side through the body housing (220). A lower distal end of cable (600) may be connected to an outside electronic device.

Hereinafter, a difference between a camera module according to a first exemplary embodiment and a camera module according to a second exemplary embodiment, and a structure for substantially and uniformly heating the first lens will be described.

Figure 9:
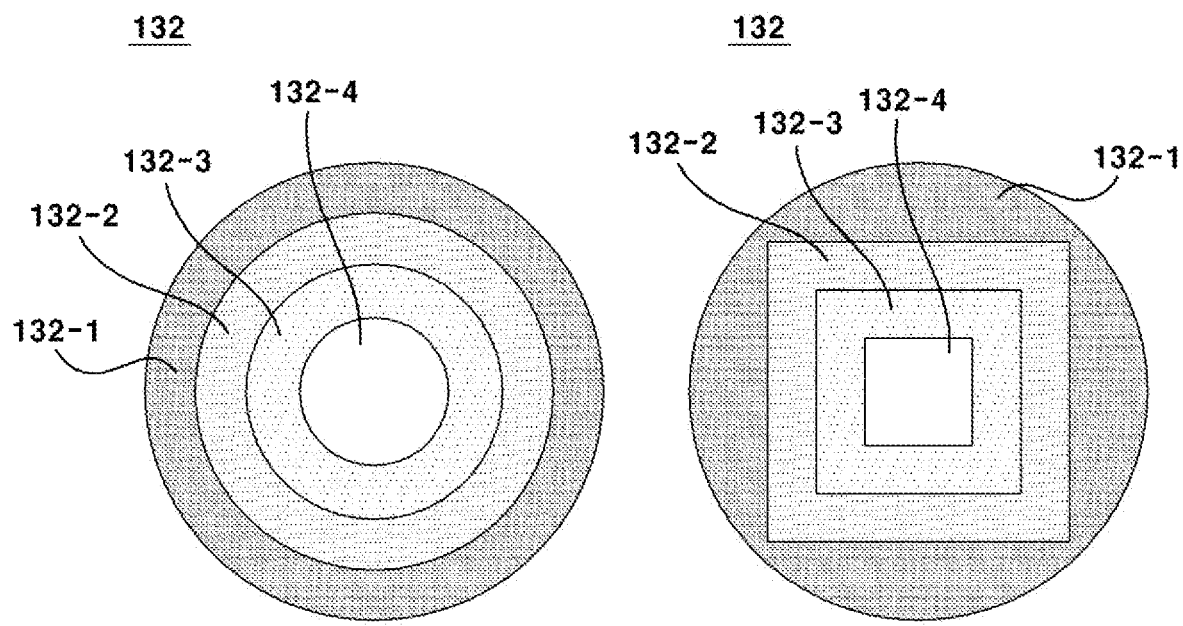
FIG. 9 is a bottom view illustrating a heating element according to a first exemplary embodiment of the present invention.
Figure 10:
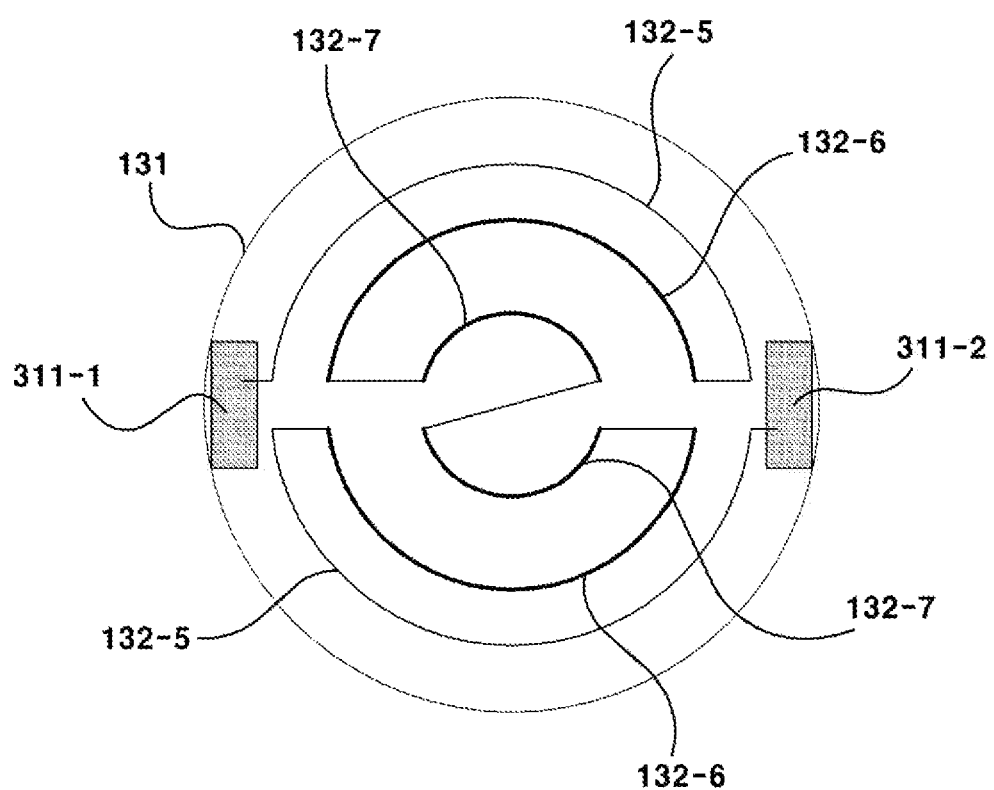
FIG. 10 is a bottom view illustrating a lens body and a heating element according to a second exemplary embodiment of the present invention.

FIG. 9 is a bottom view illustrating a heating element according to a first exemplary embodiment of the present invention, and FIG. 10 is a bottom view illustrating a lens body and a heating element according to a second exemplary embodiment of the present invention.

A resistance and a cross-sectional area of the heating element (132) are same for all areas of lens body (131), and heat may be trapped in the center of the lens body (131) by the low heat transmission rate of lens body (131) and a structure where an edge of the lens body (131) abuts the second lens barrel (120), and the heat escapes from the edge of the lens body (131). Hence, an inside temperature of the lens body (131) may become higher than an outside temperature of the lens body (131).

Because of the temperature imbalance phenomenon, even if an inside of the lens body (131) reaches a target temperature, the outside temperature of lens body (131) is still low to disable a normal operation. Furthermore, in order to solve this problem, if the outside temperature of the lens body (131) is increased, the inside temperature of lens body (131) may become higher than a designed condition to thereby generate a thermal damage.

In the first exemplary embodiment, an outside resistance of heating element (132) and inside resistance of the heating element (132) are made to be different to adjust a heating amount of outside of lens body (131) and a heating amount of inside of the lens body (131), whereby the lens body (131) can be substantially and uniformly heated.

In the second exemplary embodiment, the lens body (131) can be substantially and uniformly heated by forming the heating element (132) with a pattern shape, and adjusting a pattern cross-sectional area and a gap between outside and an inside.

Hereinafter, the heating element (132) according to the first exemplary embodiment will be described with reference to FIG. 9.

The heating element (132) according to the first exemplary embodiment may include a first heating material (132-1), a second heating material (132-2), a third heating material (132-3) and a fourth heating material (132-4).

The first heating material (132-1) may be disposed outside of the second heating material (132-2). The second heating material (132-2) may be disposed inside of the first heating material (132-1), and may be disposed outside of the third heating material (132-3). The third heating material (132-3) may be disposed inside of the second heating material (132-2), and may be disposed outside of the fourth heating material (132-4). The fourth heating material (132-4) may be disposed inside of the third heating material (132-3).

As illustrated in the left drawing of FIG. 9, the first heating material (132-1), the second heating material (132-2), the third heating material (132-3) and the fourth heating material (132-4) may respectively take a ring like plate shape. However, the innermostly disposed third heating material (132-4) may take a circular plated shape.

In this case, the first heating material (132-1) may be disposed on a radially outside of the second heating material (132-2). The second heating material (132-2) may be disposed on a radially outside of the third heating material (132-3). The third heating material (132-2) may be disposed on a radially outside of the fourth heating material (132-4).

However, the present invention is not limited thereto, and the heating element (132) of the first exemplary embodiment may take various shapes as long as the heating element (132) meets a condition where inside and outside are discernable. For example, as illustrated in the right drawing of FIG. 9, the first heating material (132-1), the second heating material (132-2), the third heating material (132-3) and the fourth heating material (132-4) may take a square ring like plate shape where weight centers are matched.

Each of the first heating material (132-1), the second heating material (132-2), the third heating material (132-3) and the fourth heating material (132-4) may have a different resistance.

The heating element (132) may be applied with a power as a CC (Constant Current) in response to an electronic control condition, and may be applied with a power as CV (Constant-Voltage). Hereinafter, resistances of the first heating material (132-1), the second heating material (132-2), the third heating material (132-3) and the fourth heating material (132-4) in response to the electronic control condition will be described.

When the power is applied as a CC, a heating amount (P) increases as a resistance (R) increases as shown by an equation of [$P=I^2R$ (where, P is a heating amount, I is a current and R is a resistance)]. That is, when the heating element (132) is controlled by a constant current power, the heating amount and the resistance are proportional.

Thus, the heating can be substantially and uniformly realized when an outside resistance of the heating element (132) is increased while an inside resistance of the heating element (132) is decreased. That is, the resistance of the heating element (132) may grow increased toward an outside of the heating element (132), and the resistance of the heating element (132) may grow decreased toward an inside of the heating element (132).

As a result, the resistance of the first heating material (132-1) may be greater than that of the second heating material (132-2). The resistance of second heating material (132-2) may be greater than that of the third heating material (132-3). The resistance of third heating material (132-3) may be greater than that of the fourth heating material (132-4).

When the power is applied as a CC, a heating amount (P) decreases as a resistance (R) increases as shown by an equation of [P=V2/R (where, P is a heating amount, V is a voltage and R is a resistance)].

Thus, the heating can be substantially and uniformly realized when an outside resistance of the heating element (132) is decreased while an inside resistance of the heating element (132) is increased. That is, the resistance of the heating element (132) may grow decreased toward an outside of the heating element (132), and the resistance of the heating element (132) may grow increased toward an inside of the heating element (132).

As a result, the resistance of the first heating material (132-1) may be smaller than that of the second heating material (132-2). The resistance of second heating material (132-2) may be smaller than that of the third heating material (132-3). The resistance of third heating material (132-3) may be smaller than that of the fourth heating material (132-4).

Hereinafter, the heating element (132) according to the second exemplary embodiment will be described with reference to FIG. 10. The heating element (132) according to the second exemplary embodiment may include a first heating pattern (132-5), a second heating pattern (132-6) and a third heating pattern (132-7).

The first heating pattern (132-5) may be disposed at an outside of the second heating pattern (132-6). The second heating pattern (132-6) may be disposed at an inside of the first heating pattern (132-5), and may be disposed at an outside of the third heating pattern (132-7). The third heating pattern (132-7) may be disposed at an inside of the second heating pattern (132-6). Each resistance of the first heating pattern (132-5), the second heating pattern (132-6) and the third heating pattern (132-7) may be same or substantially similar. That is, the first heating pattern (132-5), the second heating pattern (132-6) and the third heating pattern (132-7) may be formed with a same material.

When each resistance of the first heating pattern (132-5), the second heating pattern (132-6) and the third heating pattern (132-7) is identical, a same current may flow between the first electrode (311-1) and the second electrode (311-2). As a result, when a cross-sectional area of the pattern is large, a low current density may be formed, and when the cross-sectional area of the pattern is small, a high current density may be formed.

That is, the heating amount (generated heat) may be increased by allowing a cross-sectional area of the pattern to be smaller, and by allowing a pattern gap to be narrower when the pattern is disposed at an outside of the heating element (132). Adversely, the heating amount may be decreased by allowing a cross-sectional area of the pattern to be greater, and by allowing a pattern gap to be broader when the pattern is disposed at an inside of the heating element (132). As a result, an outside of the lens body (131) may be more heated than an inside of the lens body to substantially show a uniform temperature distribution.

A cross-sectional area (thickness and/or height) of the first heating pattern (132-5) may be smaller than that of the second heating pattern (132-6). A cross-sectional area (thickness and/or height) of the second heating pattern (132-6) may be smaller than that of the third heating pattern (132-7).

Adversely, a cross-sectional area (thickness and/or height) of the third heating pattern (132-7) may be greater than that of the second heating pattern (132-6). A cross-sectional area (thickness and/or height) of the second heating pattern (132-6) may be greater than that of the first heating pattern (132-5).

A gap between the first heating pattern (132-5) and the second heating pattern (132-6) may be narrower than that between the second heating pattern (132-6) and the third heating pattern (132-7). Adversely, a gap between the second heating pattern (132-6) and the third heating pattern (132-7) may be broader than that between the first heating pattern (132-5) and the second heating pattern (132-6).

It is preferable that the first heating pattern (132-5), the second heating pattern (132-6) and the third heating pattern (132-7) be connected in series in the abovementioned temperature control because a current flowing in the heating element (132) must be constant.

For the serial connection, the first heating pattern (132-5), the second heating pattern (132-6) and the third heating pattern (132-7) may be divided to one side and to the other side. Furthermore, for uniform disposition, the first heating pattern (132-5), the second heating pattern (132-6) and the third heating pattern (132-7) may take a circular shape divided to one side and to the other side by two gaps. That is, the divided pattern may take a half arc shape divided from one circle.

An electrical connection may be formed in the order of a first electrode (311-1), a first heating pattern (132-5) randomly selected and disposed at one side or a first heating pattern (132-5) randomly selected and disposed at the other side, a second heating pattern (132-6) randomly selected and disposed at one side or a second heating pattern (132-6) randomly selected and disposed at the other side, a third heating pattern (132-7) randomly selected and disposed at one side or a third heating pattern (132-7) randomly selected and disposed at the other side, a third heating pattern (132-7) excepted from a random selection, a second heating pattern (132-6) excepted from a random selection, a first heating pattern (132-5) excepted from a random selection and a second electrode (311-2).

For example, as illustrated in FIG. 10, an electrical connection may be formed in the order of a first electrode (311-1), a first heating pattern (132-5) disposed at an upper side, a second heating pattern (132-6) disposed at an upper side, a third heating pattern (132-7) disposed at an upper side, a third heating pattern (132-7) disposed at a lower side, a second heating pattern (132-6) disposed at a lower side, a first heating pattern (132-5) disposed at a lower side and a second electrode (311-2).

However, in a modification, the heating pattern may be formed in an undivided single surface pattern or dot pattern in case of an innermostly disposed pattern as in the third heating pattern (132-7), for example. As a result, selection of circuit connection order of an innermostly disposed pattern may be omitted.

Meantime, the foregoing explanations are intended only to be illustrative of the technical ideas of the present invention, and therefore, it should be appreciated by the skilled in the art that various modifications and amendments to the above examples may be made without deviating from the scope of protection of the invention.

The invention claimed is:

1. A camera module, comprising:
a housing;
a lens holder disposed outside of the housing;
a substrate unit disposed in the housing;

a lens module disposed in the lens holder and including:
  a first lens exposed to an outside of the housing,
  a first lens barrel disposed inside the lens holder and accommodating a second lens, and
  a second lens barrel disposed at an outside of the lens holder to expose the first lens to the outside of the housing, wherein a portion of the lens holder is between the first lens barrel and the second lens barrel;
a heating element disposed on a lower surface of the first lens;
an image sensor mounted on the substrate unit so as to correspond to the lens module; and
a connection unit for applying power to the lens module, wherein
the connection unit comprises:
  a first connecting member electrically connected to the heating element so as to supply power; and
  a second connecting member extending from the first connecting member and along a lateral surface of the first lens barrel to an inside of the housing, and electrically connecting to the first connecting member and the substrate unit, and
  the first connecting member is disposed between the first lens barrel and the first lens.

2. The camera module of claim 1, wherein the second lens barrel is disposed on the lens holder to couple to the first lens, wherein the first lens barrel includes a connection member reception unit disposed on the lateral surface of the first lens barrel and formed with a first reception hole through which the second connecting member passes.

3. The camera module of claim 2, wherein the connection member reception unit is screwed to the inner surface of the lens holder.

4. The camera module of claim 2, wherein a third connecting member extends from the first connecting member and along a lateral surface of the first lens barrel to the inside of the housing to electrically connect the first connecting member and the substrate unit, and
  the connection member reception unit includes a second receiving hole through which the third connecting member passes.

5. The camera module of claim 4, wherein a positive voltage is applied to the second connection member, and
  a negative voltage is applied to the third connection member.

6. The camera module of claim 1, wherein the first lens barrel includes a connection member reception unit disposed at the lateral surface of the first lens barrel and formed with a first reception hole through which the second connecting member passes.

7. The camera module of claim 6, wherein the second lens barrel is screwed to an outer surface of the lens holder.

8. The camera module of claim 1, wherein the first connecting member is an insulation material-coated ring-shaped PCB (Printed Circuit Board), and includes an electrode unit exposed from the insulation material to be electrically connected to the heating element.

9. The camera module of claim 8, wherein the electrode unit includes a first electrode and a second electrode, wherein the first electrode is electrically connected to the heating element by a first conductive member, and the second electrode is electrically connected to the heating element by a second conductive member.

10. The camera module of claim 9, wherein each of the first and second conductive members is a conductive adhesive, an isotropic conductive film or an anisotropic conductive film.

11. The camera module of claim 9, wherein the first electrode and the second electrode are disposed symmetrically with respect to a center of the first connecting member.

12. The camera module of claim 9, wherein the first electrode and the second electrode are in an arc shape disposed radially inward of the first connecting member.

13. The camera module of claim 9, wherein each of the first electrode and the second electrode has a rectangular shape.

14. The camera module of claim 8, wherein the first lens includes a first reflection prevention unit disposed at an upper surface of a lens body, and a second reflection prevention unit disposed at a lower surface of the heating element, wherein an area corresponding to the electrode unit at a lower surface of the heating element is electrically connected to the electrode unit by being exposed from the second reflection prevention unit.

15. The camera module of claim 1, wherein the second connecting member includes a first terminal disposed at a first side in a plated shape extended from the first connecting member to the substrate unit and electrically connected to the first connecting member and a second terminal disposed at a second side to be electrically connected to the substrate unit.

16. The camera module of claim 15, wherein the first terminal is electrically connected to the first connecting member by a third conductive member, wherein the third conductive member is a conductive adhesive, an isotropic conductive film or an anisotropic conductive film.

17. The camera module of claim 1, wherein the first connecting member and the second connecting member are separate members, and are electrically connected to each other.

18. The camera module of claim 1, wherein the first connecting member and the second connecting member are flexible printed circuit boards.

19. The camera module of claim 1, comprising a cable extending outwardly through the housing,
  wherein the substrate unit comprises:
  a first substrate on which an image sensor is disposed; and
  a second substrate on which the cable is mounted and electrically connected to the first substrate through a substrate connector.

20. The camera module of claim 1, wherein an outside resistance of the heating element and inside resistance of the heating element are different, or
  the heating element includes a first heating pattern, a second heating pattern disposed at an inside of the first heating pattern and a third heating pattern disposed at an inside of the second heating pattern, a cross-sectional area of the first heating pattern is smaller than that of the second heating pattern, a cross-sectional area of the second heating pattern is smaller than that of the third heating pattern, a gap between the first heating pattern and the second heating pattern is narrower than that between the second heating pattern and the third heating pattern.

21. A vehicle, comprising:
a body;
one or more doors mounted on the body;
a display unit disposed at an inside of the body; and a camera module disposed on any one or more of the body, or one or more of the doors to be electrically connected to the display unit, wherein the camera module comprises:
a housing;
a lens holder disposed outside of the housing;
a substrate unit disposed in the housing;
a lens module disposed in the lens holder and including:
   a first lens exposed to the outside,
   a first lens barrel disposed inside the lens holder and accommodating a second lens, and
   a second lens barrel disposed at an outside of the lens holder to expose the first lens to the outside of the housing, wherein a portion of the lens holder is between the first lens barrel and the second lens barrel;
a heating element disposed on a surface of the first lens;
an image sensor mounted on the substrate unit so as to correspond to the lens module; and
a connection unit for applying power to the lens module, wherein
the connection unit comprises:
   a first connecting member electrically connected to the heating element so as to supply power; and
   a second connecting member extending from the first connecting member and along a lateral surface of the first lens barrel to an inside of the housing, and electrically connecting to the first connecting member and the substrate unit,
the first connecting member is disposed between the first lens barrel and the first lens, and
the surface of the first lens where the heating element is disposed faces to the first lens barrel.

* * * * *